United States Patent [19]
Eisenstadt

[11] 3,875,312
[45] Apr. 1, 1975

[54] DIPEPTIDE SWEETENER COMPOSITION

[75] Inventor: Marvin E. Eisenstadt, Belle Harbor, N.Y.

[73] Assignee: Cumberland Packing Corporation, Brooklyn, N.Y.

[22] Filed: July 2, 1973

[21] Appl. No.: 375,697

Related U.S. Application Data

[63] Continuation-in-part of Ser. No. 320,210, Jan. 2, 1973, abandoned.

[52] U.S. Cl................. 426/212, 426/213, 426/217, 426/804
[51] Int. Cl............................................... A23l 1/26
[58] Field of Search..................... 426/212, 213, 217

[56] References Cited
UNITED STATES PATENTS

| | | | |
|---|---|---|---|
| 3,061,445 | 10/1962 | Stanish............................ | 426/217 X |
| 3,492,131 | 1/1973 | Schlatter............................ | 426/212 |
| 3,625,711 | 12/1971 | Eisenstadt............................ | 426/213 |

*Primary Examiner*—Raymond N. Jones
*Assistant Examiner*—Esther L. Massung
*Attorney, Agent, or Firm*—Steinberg & Blake

[57] ABSTRACT

The artificial sweetener known as dipeptide sweetener, which is actually aspartyl phenylalanine methyl ester is mixed with specific proportions of cream of tartar and/or sodium bicarbonate or potassium bicarbonate and lactose and/or dextrose in order to improve the sweetening properties of the composition and to give the same the more natural sweetness of ordinary sugar.

10 Claims, No Drawings

DIPEPTIDE SWEETENER COMPOSITION

CROSS REFERENCE TO RELATED APPLICATION

This application is a continuation-in-part of my copending application Ser. No. 320,210, filed Jan. 2, 1973, for "Artificial Sweetener Composition", now abandoned.

BACKGROUND OF THE INVENTION

The use of artificial sweeteners in the place of sugar for reduction of caloric intake as well as for medical reasons not only in connection with the treatment of obesity but also for diabetes, is well known. Until recently the only artificial sweeteners which have been used were the saccharines and the cyclamates.

Recently the cyclamates have been banned from use by the Food and Drug Administration, and the use of saccharines has also become questionable in recent times.

A new artificial sweetener known as dipeptide sweetener, which is actually aspartyl phenylalanine methyl ester has recently been developed. Although this product has not as yet come into actual extensive use, it has already been determined that like the cyclamates and saccharine, the dipeptide sweetener although many times as sweet as sugar, actually about one hundred and fifty times as sweet as sugar, does not have the natural sweetness taste of ordinary sugar. The dipeptide sweetener actually exhibits a flat sweetness along with a slight bitter aftertaste. Moreover, when used for the sweetening of beverages, for example, the sweet taste is slightly delayed. In other words, someone drinking a cup of coffee sweetened with dipeptide sweetener would at first not taste the sweetness. Shortly thereafter the sweet taste would appear, but this sweet taste would not be a natural sweet taste because of what may best be referred to as a flatness of taste, and in addition a bitter aftertaste occurs in the mouth of the user.

SUMMARY OF THE INVENTION

Generally speaking, in accordance with the present invention, a composition is provided of dipeptide sweetener plus cream of tartar and/or a bicarbonate (sodium bicarbonate or potassium bicarbonate) as well as lactose and/or dextrose in specific proportions. This composition is many times as sweet as natural sugar, and can nevertheless be used for sweetening purposes with the same natural sweetness as in the case of ordinary sugar.

It is accordingly a primary object of the present invention to provide a sweetening composition utilizing dipeptide sweetener as the artificial sweetening agent, which composition does not have the flat sweetness taste or cloying sweetness of the dipeptide sweetener and in addition does not have the bitter aftertaste of the dipeptide sweetener.

It is yet a further object of the present invention to provide compositions of dipeptide sweetener plus cream of tartar and/or a bicarbonate plus lactose and/or dextrose, which composition has a natural sweet taste without undersired aftertaste or cloying sweetness which can be used for all types of foods for providing a sweetening effect which is akin to that of natural sugar.

Other objects and advantages of the present invention will be apparent from a further reading of the specification and of the appended claims.

The term "dipeptide sweetener" as used herein refers to aspartyl phenylalanine methyl ester. The term "saccharine artificial sweetener" as used herein is meant to refer to saccharine itself and the salts thereof such as sodium saccharine, potassium saccharine, etc. Cream of tartar is of course also known as potassium bitartrate and these terms will be used interchangeably.

In accordance with the present invention, the following composition is prepared: (a) the dipeptide sweetener is mixed with (b) cream of tartar and/or sodium bicarbonate or potassium bicarbonate, and also with (c) lactose and/or dextrose in a ratio of one part of (a) dipeptide sweetener to 0.1–10 parts of (b), most preferably 0.5–5 parts of (b) and with 5–30 parts of (c), most preferably 10–20 parts of (c). All parts herein are parts by weight.

When these components are used in these proportions, the most desired effect of sweetness approaching that of natural sugar without any flatness of taste and without any cloying sweetness or any bitter aftertaste is obtained.

It should also be noted that in accordance with the present invention it is possible to substitute up to 50 percent by weight of the dipeptide sweetener with a saccharine artificial sweetener.

In connection with this invention it is noted that too great an amount of lactose can result in the masking of the sweetness of the dipeptide sweetener as well as the masking of the taste of the food or beverage to which it is applied, so that it is essential that the amount of lactose be within the limits set forth herein. Furthermore, if lactose alone were used in compositions of the invention, in order to obtain a sufficient amount of lactose with the dipeptide sweetener to mask the undesired unnatural sweetness thereof, the amount of lactose would be so great that it would mask the taste of the food or beverage to which the composition is applied. For this reason, it is necessary to use the cream of tartar or sodium bicarbonate or potassium bicarbonate along with the lactose. However, if cream of tartar or the bicarbonate were used without the lactose (or dextrose as discussed below) with the dipeptide sweetener, it would be impossible to mask the undesired taste characteristics of the dipeptide sweetener.

On the other hand, dextrose is actually a sweetening agent and dextrose alone does not have the effect of sufficiently masking the undesired sweetening effect of the dipeptide sweetener. It is only by using the dextrose in combination with the cream of tartar or sodium bicarbonate or potassium bicarbonate that it is possible to achieve the natural sweetness of the composition with the present invention.

Thus, in accordance with the present invention it is necessary to use cream of tartar powder (potassium bitartrate) and/or sodium bicarbonate and/or potassium bicarbonate with lactose and/or dextrose in the proportions indicated above along with the dipeptide sweetener in order to obtain a masking of the flat sweetness and bitter aftertaste and the development of a rapid natural sweetness. As indicated above, up to 50 percent of the dipeptide sweetener can be substituted by saccharine without any adverse effects.

In percentages by weight, the composition of the present invention consists essentially of about 80–98 percent of lactose and/or dextrose (preferably 90–97 percent), about 1–4 percent of the dipeptide sweetener (up to 50 percent of which may be substituted by saccharine), preferably about 2–3 percent, and about 0.1–6 percent, preferably about 1–2 percent of any one or a combination of cream of tartar, sodium bicarbonate and potassium bicarbonate.

DESCRIPTION OF PREFERRED EMBODIMENTS

The following examples are given to further illustrate the present invention. The scope of the invention is not, however, meant to be limited to the specific details of the examples.

EXAMPLE 1

37.5 lbs. of lactose (powdered), 3 lbs. of dipeptide sweetener (aspartyl phenylalanine methyl ester) and 0.5 lbs. of cream of tartar are thoroughly mixed to provide a uniform mixture.

The resulting mixture is approximately ten times as sweet as sugar and can be used in the place of sugar to give a sweetening effect with low caloric intake. This composition can be used to sweeten beverages or in cooking, in all quantities, even to highly sweeten beverages, without causing any bitter aftertaste and without adversely affecting the taste of the food or beverage to which it is applied.

EXAMPLE 2

A sweetening composition is prepared as in Example 1, however, using 3 lbs. of cream of tartar and 4 lbs. of dipeptide sweetener.

EXAMPLE 3

A sweetening composition is prepared as in Example 1, however using 1.5 lbs. of dipeptide sweetener and 0.75 lbs. of sodium saccharine.

EXAMPLE 4

A sweetening composition is prepared as in Example 1, however substituting dextrose for lactose. This composition may be used in the same manner as Example 1.

EXAMPLE 5

A sweetening composition is prepared as in Example 1, however using 0.5 lbs. of sodium bicarbonate in place of the cream of tartar. This composition may be used in the same manner as Example 1.

EXAMPLE 6

A sweetening composition is prepared as in Example 1, however using 1.5 lbs. of cream of tartar, 1.5 lbs. of potassium bicarbonate and 4 lbs. of dipeptide sweetener.

EXAMPLE 7

A sweetening composition is prepared as in Example 6, however substituting dextrose for the lactose.

EXAMPLE 8

A sweetening composition is prepared as in Example 1, however using 20 lbs. of dextrose and 17.5 lbs. of lactose. This composition may be used in the same manner as Example 1.

While the invention has been described in particular with respect to use of specific amounts of specific ingredients, it is to be understood that variations and modifications of the invention can be made without departing from the spirit or scope thereof.

What is claimed is:

1. A sweetening composition consisting essentially of (a) dipeptide sweetener, (b) at least one agent selected from the group consisting of potassium bitartrate, sodium bicarbonate and potassium bicarbonate, and (c) at least one compound selected from the group consisting of lactose and dextrose, in proportions by weight of about 0.1–10 parts (b) per each part of (a) and about 5–30 parts of (c) per each part of (a).

2. Composition according to claim 1 wherein said compound is lactose.

3. Composition according to claim 1 wherein said compound is dextrose.

4. Composition according to claim 1 wherein said compound is a mixture of lactose and dextrose.

5. Composition according to claim 1 wherein said agent is potassium bitartrate.

6. Composition according to claim 1 wherein said agent is sodium bicarbonate.

7. Composition according to claim 1 wherein said agent is a mixture of potassium bitartrate and sodium bicarbonate.

8. Composition according to claim 1 wherein the proportions of the components are 0.5–5 parts of (b) per each part of (a) and 10–20 parts of (c) per each part of (a).

9. Composition according to claim 1 wherein up to 50 percent said dipeptide sweetener is substituted by saccharine artificial sweetener.

10. Composition according to claim 1 wherein said agent is selected from the group consisting of sodium bicarbonate and potassium bicarbonate plus potassium bitartrate.

* * * * *